May 23, 1961     G. T. RANDOL     2,985,146
CONTROL VALVE ADAPTED FOR VACUUM-POWER STEERING USE
Original Filed Jan. 3, 1957
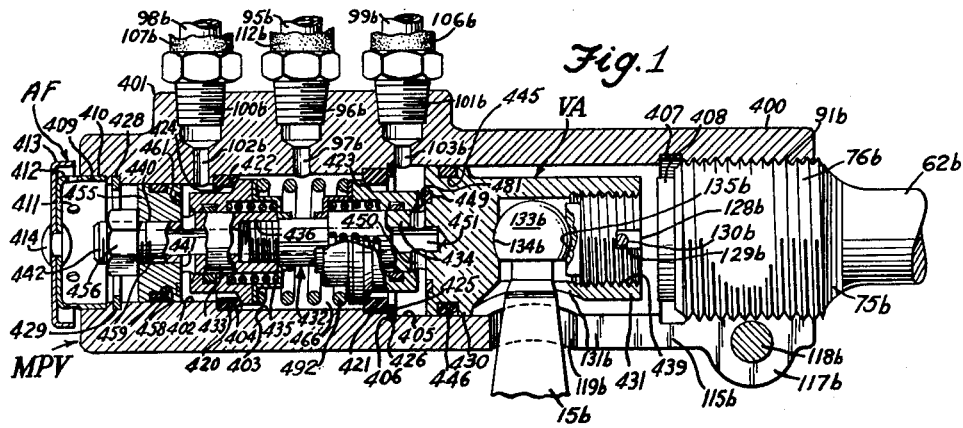
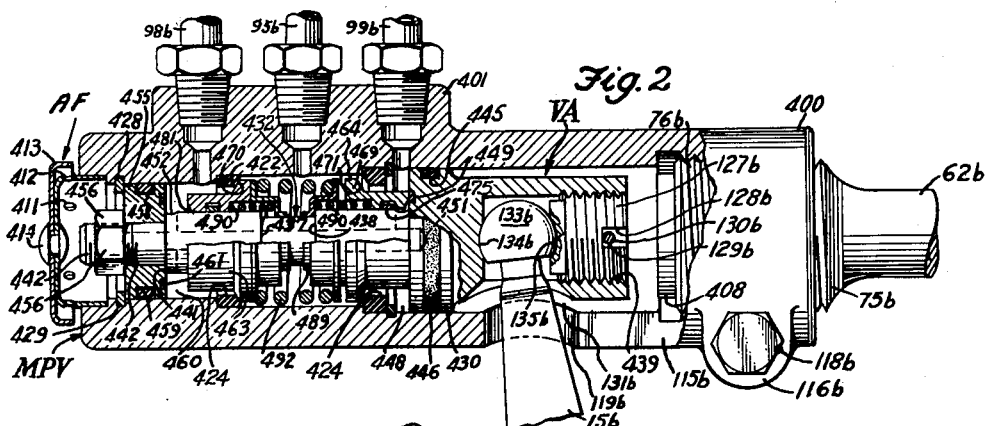
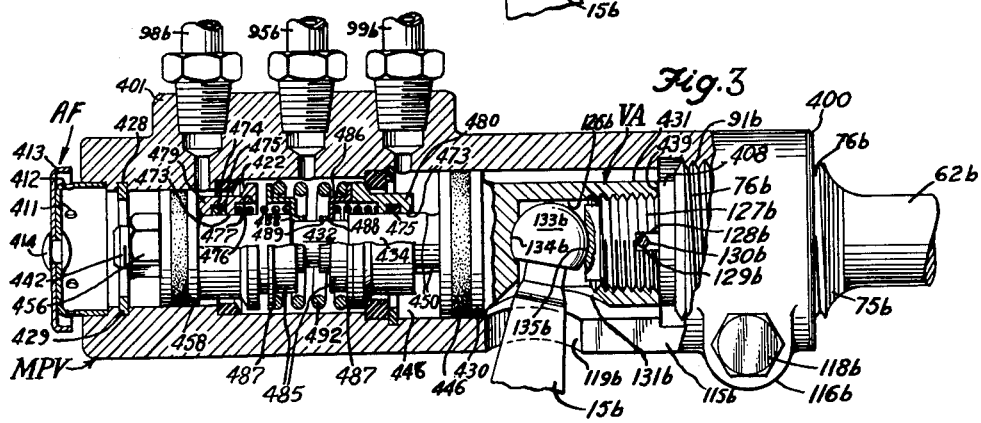
Inventor United States Patent Office 2,985,146
Patented May 23, 1961

2,985,146

CONTROL VALVE ADAPTED FOR VACUUM-POWER STEERING USE

Glenn T. Randol, 2nd and Paul Sts., Box 53, Mountain Lake Park, Md., assignor of fifty percent to Hamill-Markus Industries, Inc., Warren, Mich.

Original application Jan. 3, 1957, Ser. No. 632,365. Divided and this application Mar. 13, 1959, Ser. No. 799,370

9 Claims. (Cl. 121—46.5)

The present invention relates to novel control valve means for pressure differential actuated motors and is a division of my copending earlier application Serial No. 632,365, filed January 3, 1957.

In my copending application referred to, I have disclosed a vacuum operated booster steering mechanism including a fluid-pressure actuated motor and control valve means therefor, said means being disclosed in the form of a sliding-type valve structure and a poppet-type valve structure. There are certain features of construction and operation which relate particularly to the poppet-type control valve per se, thus rendering such control valve applicable for controlling various types of known servomotors which utilize a pressure differential actuating medium to activate the same. These features of the poppet-type control valve means per se form the subject-matter of the present application.

The present invention has for a primary objective, the provision of a novel poppet-type follow-up control valve which utilizes a pair of poppet-type elements responsive to relative movement of one element to the other and to a valve housing in which said elements are operatively disposed, to control energization and de-energization of a double-acting servomotor.

A further object is to provide such a control valve for controlling either a double-acting or single-acting servomotor, and means for actuating said elements relatively as aforesaid.

Another salient feature of the present follow-up control valve provides for a single centralizing spring to bias said elements apart to their relative normal positions engaging fixed cooperative seat portions to de-energize said servomotor, and including an auxiliary spring for holding the selected element seated until positive activation thereof is effected by the actuating element to unseat the same thereby activating said servomotor in a direction controlled by the selected element. Each of said valve elements is provided with such an auxiliary spring to prevent fortuitous opening of the control valve to either of its two operating positions from a "neutral" position prior to positive unseating actuation of the actuating element which is preferably operator-actuated.

Another important object of my invention is to provide novel follow-up poppet-type control valve means which incorporate removable fixed valve seats to enable use of different materials more suitable for the purpose than would be the material from which the valve body would be fabricated. This removable characteristic also reduces maintenance cost and therefore provides for longer service life.

Another object is to provide a member movable relatively to and in unison with each of said poppet elements under influence of said actuating means in opposition to the bias of said single centralizing spring whereby said auxiliary springs each cooperate with said actuating means to overcome said centralizing spring in the direction of movement of said poppet element to unseat the same.

Other objects and advantages of the invention will become apparent by reference to the following detailed description taken in connection with the accompanying drawing, in which:

Figure 1 is a longitudinal vertical section of my improved poppet-type follow-up control valve incorporated exemplarily in the steering linkage of a motor vehicle or the like, the illustrative relative positions of the parts corresponding to a halted position of the steering wheel;

Figure 2 is a view similar to Figure 1 but showing the parts of the control valve in positions for controlling the vacuum servo to assist in a right turn of the vehicle; and Figure 3 is another operated view of Figure 1 showing the control valve conditioned to control the vacuum servo to assist in a left turn of the vehicle.

This invention has a particular use and value in connection with motor vehicles or the like having the known forms of manual steering gears and associated steering linkage actuated thereby. It also has particular adaptation to control of pressure differential actuated motors.

It will be understood from the description to follow that the cycle of operation and various features of my improved poppet-type follow-up control valve are clearly adaptable to control assemblies other than the foregoing. This cycle relates to the two-way or one-way energization of a power-mechanism responsive to corresponding movements of an operator-operated member, such as, in the present disclosure, the steering wheel.

Referring now to the drawing wherein like characters of reference identify like and corresponding parts in the several views, the illustrated embodiment of my invention is disclosed in connection with a vehicular steering gear comprising the usual steering pitman arm (actuating member) 156 and steered cross rod or drag link 62b, said steering arm being responsive to the turning movements of the steering wheel shown in my parent copending application Serial No. 632,365 filed January 3, 1957 of which the present application is a division. Reference may be had to this earlier filed application for greater detail of the manner in which the present invention cooperates with the manual steering gear fully disclosed therein to assist in steering the dirigible wheels of the vehicle.

This novel poppet-type follow-up control valve is generally designated "MPV" and comprises: a hollow cylindrical housing or body 400 medially formed on its exterior with a substantially rectangular longitudinal embossment 401, fitted in spaced alignment with tubular fittings 98b, 95b, and 99b threaded into bores 100b, 96b, 101b communicating with ports 102b, 97b, and 103b through the body wall, respectively, communicating with the interior, a longitudinal bore 402, a medially disposed counterbore 403 forming an internal annular shoulder 404 with the bore 402, another counterbore 405 merging with the first-mentioned counterbore to form an annular internal shoulder at 406, an annular groove 407 formed in the counterbore 405 with the terminal portion threaded at 91b to receive the enlarged threaded end 76b of the center link 62b for assembly of the valve body to the steering linkage. A reduced extension 408 projects inwardly from the end 76b. A terminal recessed portion 409 of the bore 402 is fitted with a cup-shaped breather member 410 having air holes 411 through the cylindrical wall adjacent the outer end wall 412 thereof, and a cup-shaped baffle member 413 is telescopically disposed on the exterior of the end wall as by a rivet 414, with the cylindrical portion thereof in spaced circular alignment with respect to the holes 411 to thus provide a breather assembly generally designated "BA" to enable air to communicate with the interior of the valve body.

A pair of ring members 420, 421, preferably made of plastic or fibre material, are disposed in the counterbores 403, 405, respectively, in longitudinally spaced relation in engagement with the annular shoulders 404, 406, respectively, with member 420 pressfitted in said counterbore 403 to stabilize it against shoulder 404. Portions of the confronting sides of said members are formed as angular, preferably conical, fixed valve seats 422, 423, respectively, with each member having a central opening 424 in coaxial disposition. A split retainer ring 425 is adapted to engage an internal annular groove 426 formed in the surface of the counterbore 405 adjacent the opposite side of the ring member 421 to stabilize this ring in its operative position shown in Figure 1. An annular internal groove 428 is provided at the outer terminus of the longitudinal bore 402 for reception of a split retainer ring 429. A slidable valve actuator generally designated "VA" is disposed in the hollow of the valve body coaxially disposed with respect thereto, and is adapted to project through the openings 424. This actuator comprises: an intermediately disposed integral annular flange 430 having a rightward projecting reduced cylindrical extension 431, and a leftward projecting reduced cylindrical extension 432 comprising two coaxial cylindrical sections 433, 434. Section 433 terminates with a reduced diameter portion 435 having external threads engaging internal threads formed in a counterbore 436 in the confronting end of the section 434 to rigidly join the normal diameters of these sections in spaced relation as defined by the exposed smooth portion of 435. An annular shoulder 437 is formed at the juncture of the portion 435 with section 433, and another confronting shoulder 438 spaced from shoulder 437 is provided by the reduced diameter portion 435 of the section 434. This composite arrangement of extension 432 is necessitated for assembly of the valve parts as will appear. Extension 431 is adapted for reception of the ball end 133b of the pitman arm 18b to provide a universal connection therebetween with the end 439 of the extension 431 spaced from the stop 408 as shown in Figure 1 when the control valve MPV is in balanced "neutral" condition corresponding to straight ahead or halted turning steering control. Displacement of the valve actuator VA rightward through its full operating stroke, as shown in Figure 3, brings the end 439 into engagement with the stop 408 to limit the operating stroke of the actuator in that direction, and thus enable direct manual steering in the event of partial or complete failure of power assistance as is understood. When the servomotor SM² illustrated in the parent application Serial No. 632,365 filed January 3, 1957 is assisting in the steering effort, the end of the valve actuator is spaced from the stop 408 in varying degrees as will appear. The outer end of the section 434 terminates into a reduced diameter portion 440 forming an annular shoulder 441 therewith with the end of the reduced portion externally threaded at 442.

The flange 430 is fitted with an external annular groove 445 and a flexible sealing member 446 carried therein in engaging contact with the surface of the counterbore 405 to form an air-vacuum chamber 448 between the confronting sides of the flange and ring member 421. Embedded in the inner side of the flange and encircling the extension 432 is a washer-type valve seat 439, and adjacent this seat, radial air ports 450 are provided in the extension 432 for communicating with an axial passageway 451 extending from the outer end thereof to a point in circular alignment with flange 430, and similar radial ports 452 are provided adjacent the shoulder 441 communicating with the axial passageway aforesaid. A detachable collar member 455 is fitted on the threaded portion 440 against the shoulder 441 and rigidly secured together by a nut 456 drawn tight on the threaded portion against the opposite side of the collar to enable conjoint movement of the collar with the actuator extensions. This collar carries an external annular groove 458 in its peripheral surface fitted with a flexible sealing member 459 engaging the surface of the longitudinal bore 402 in air-tight sealing relationship to form an air-vacuum chamber 460 between the confronting sides of the collar and ring member 420. A washer-type valve seat 461 similar to seat 449 is embedded in the inner face of the collar.

A pair of identical sleeve-type valve elements 463, 464 are slidably fitted in air-tight sealing relationship on the extension 432 in longitudinally spaced relation to form an annular vacuum chamber 466 therebetween, with their opposed ends adapted to project through the openings 424. The inner confronting ends of the elements are formed with annular flanges 468, 469 having angular faces 470, 471 for cooperating with the seats 422, 423, respectively. Bores 473 through these sleeve elements are fitted with an internal annular groove 474 which carry flexible sealing members 475 in encircling disposition with respect to the extension 432 to appropriately effect the aforesaid sealing relationship therebetween. The confronting ends are provided with a counterbore 476 forming a shoulder at 477 with the bores 473. The opposed ends 479, 480 of the sleeve elements are chamfered at 481 and adapted to engage the washer seats 449, 461 to selectively isolate radial ports 450, 452 from their respective chambers 448 and 460 when the actuator is moved to operating positions shown in Figures 2 and 3, respectively, to cause power-assistance by the servomotor (see parent application S.N. 632,365).

The confronting ends of the sleeve valve elements are each engaged by an annular spring seat 485 which encircles the extension 432. This spring seat comprises a hollow cylindrical portion 486 spaced from said extension, formed with an outturned annular flange 487 adapted to normally bear on the end face of the sleeve elements, an inturned annular flange 488 forming the inner end of the seat, and a reduced cylindrical portion 489 projecting inwardly from the inturned flange to serve as a bearing support for the spring seat on the reduced portion 435 with the shoulders 437, 438 normally engaging the inner marginal portion of the inturned flanges 488. Assembly of the pair of annular seat members in confronting relationship between the shoulders 437, 438 on the portion 435 is effected before the sections 433, 434 are threaded together as previously explained. A normally preloaded compression spring 490 reacts between the shoulder 477 and flange 488 of each of the two spring seats 485 tending to bias the latter and their respective cooperating valve elements 463, 464 apart. These two springs encircle the cylindrical sections 433, 434, respectively, which serve as guides to prevent disalignment of the spring coils. Another normally preloaded helically formed compression centering spring 492 is operably disposed in encircling relation with respect to the seats and extension aforesaid with its ends reacting on the confronting side of the outturned flanges 487 to thus overcome the springs 490 and bias the seats 485 and cooperating valve elements into engagement with their respective seats 422, 423 to dispose the control valve MPV in balanced (closed) conditions corresponding to driving with the steering mechanism in the position of Figure 1.

Port 97b is adapted to communicate with vacuum chamber 466, and ports 102b and 103b communicate with chambers 460 and 448 respectively. Flexible conduit 106b is connected to fitting 99b and the other conduit 107b leading to the servomotor is connected to fitting 98b, whereby operation of the control valve MPV to its two operating positions portrayed in Figures 2 and 3 causes the power diaphragm to reciprocate to assist in turning the vehicle wheels according to the rotation of the steering wheel.

In operation, counterclockwise rotation of the steering wheel displaces the valve actuator VA rightward relatively to the valve body as viewed in Figure 3 to first bring the valve seat 461 into engagement with the valve element end 479 to close radial ports 452 and thus isolate chamber 460 from atmosphere. At the same time shoulder 437 acts on the inturned flange 488 of the annular spring seat 485 to space the out-turned flange 487, with increased tension created in the spring 492 acting on the other valve element 464, from the ring member 420 as shown in Figure 3, thus enabling spring 490 to relax slightly while continuing to bias the valve element 463 into seated relationship with its cooperating seat 422 to thus maintain this valve closed. Additional displacement of the valve actuator rightward displaces the valve element 463 in unison with the collar 455 to the position of Figure 3 for a full working stroke thereof, if desired, with the end 439 engaging the stop 408, whereby further manual movement of the steering wheel to the left enables direct manual operation of the steering linkage, in the event of partial or complete failure of the servomotor to operate. Accordingly, the valve element 463 is unseated placing the vacuum chamber 466 in communication chamber 460, thence port 102b, conduit 107b, and connected power chamber in the servomotor to evacuate the latter of air and thus cause differential pressures on opposite sides of the power diaphragm in said servomotor to move it rightward as viewed in Figure 1 to provide power assistance from the servomotor to steer the vehicle to the left. During this actuation of the servomotor, the disconnected power chamber thereof is maintained vented to atmosphere via conduit 106b, port 103b, chamber 448, radial ports 450, axial passageway 451, and breather assembly BA.

From the foregoing description of the operation of my improved control valve, it is seen that the single centering spring 492 applies increased tension on the closed valve element when the other element is unseated causing a selected operation of the servomotor, to insure that the other element is properly closed to prevent loss of vacuum from chamber 466. This spring also acts sequentially from the operated positions shown in Figures 2 and 3, through the tubular seats, acting on whichever shoulder 437, 438 is engaged therewith to center the valve actuator and associated steering linkage with respect to the valve body in balanced "neutral" condition as portrayed in Figure 1 and to bias the open valve element to seated closed position, and thereafter maintain both valve elements and valve actuator in balanced "neutral" position in readiness for another power assisted steering cycle in the direction desired.

The two identical springs 490 which react on the inturned flanges 488 and shoulders 437, 438, respectively, tending to force them apart, possess novel characteristics in that when the force of the heavier centering spring 492 is withdrawn from the selected valve element to be opened to control power assistance according to the rotation of the steering wheel, the spring 490 associated with that element maintains said element on its seat, best demonstrated in Figures 2 and 3, while the associated atmospheric valve comprising either valve seat 461, valve end 479, and radial ports 452, or valve seat 449, valve end 480, and radial ports 450 depending on which valve element is being opened. Thereafter, the seated contact between the ends 479 or 480 of the valve elements 463, 464 with their cooperating washer seats 461 and 449 enable conjoint movement of the sleeve element with the valve actuator by either the collar 455 or flange 430 as the case may be, to open position shown in Figures 2 and 3 respectively. Accordingly, springs 490 perform the important and novel function of enabling closure of atmospheric ports 450, 452 prior to unseating (opening) of the valve elements 463, 464 to keep the vacuum confined within chamber 466, and during selective closure of the valve elements aforesaid by action of the centering spring 492, springs 490 insure that the active valve element will be properly seated (closed) prior to opening of the associated atmospheric valve aforesaid. With this novel spring arrangement, a slight overlap is maintained between the pairs of vacuum and atmospheric valves to completely isolate the atmosphere from vacuum or vice versa during selective operation of the poppet elements 463, 464. For purpose of exemplification only the operation and function of this modified steering system was explained for executing a left turn. For accomplishing a right turn the steering wheel would be rotated clockwise from the driver's viewpoint in Figure 1 causing the valve actuator VA and associated parts to assume the positions shown in Figure 2 wherein the other servomotor chamber is evacuated via connected ports 97b and 103b with radial ports 450 closed and the disconnected chamber being subjected to atmospheric pressure via conduit 107b, port 102b, chamber 448, radial ports 452, axial passageway 451 and breather assembly BA.

This novel valve structure has a wide range of applications for controlling pressure differential motors such as disclosed in my parent copending application responsive to a personally-operated member herein illustrated by way of example, as the steering wheel of a motor vehicle. The single centering spring 492 serves to adjust the moving parts to centralized (neutral) positions with respect to the valve body and movable valve elements in effectively sealed relation, and which, by reason of their self-sealing characteristics provide long service life free of adjustments and replacements of sealing members due to wear. In fact, any type of follow-up power control responsive to a personally-operated member may be readily accomplished efficiently with this valve structure whether the fluid medium be super-atmospheric or sub-atmospheric.

The illustrative embodiment of my invention comprises two substantially identical valve units teamed together to control a double-acting pressure differential motor, either of said valve units being separately adaptable to control a single-acting motor. The invention therefore contemplates use of the two units together in the manner illustrated and described herein, or use of one of said valve units to control a single-acting motor usually actuated in one direction by spring means and in the opposite direction under influence of differential pressures in commercial practice.

In the dual-valve assembly MPV the vacuum chamber 466 is disposed between the poppet elements 463, 464 while if only one of the valve units is utilized, the vacuum chamber would be disposed between one end of the valve body and the single poppet element with the spring 492 reacting between the end of the valve body and poppet element.

The preferred embodiment of the invention has been illustrated and described. It is to be understood, however, that the invention contemplates any and all modifications, substitutions, and/or arrangements of the co-operating elements thereof that may fall within the purview of the claims hereunto appended.

Having thus described my invention, I claim:

1. In valvular mechanism comprising: a hollow valve body; a pair of longitudinally spaced internal annular shoulders provided with coaxial openings therebetween; a pair of annular valve seats disposed in confronting relationship in engagement with said shoulders and provided with coaxial openings therebetween; an annular internal groove adjacent one of said seats; a split retainer ring engaging said groove to maintain said seat against said one shoulder; a pair of sleeve-type movable valve elements provided with coaxial openings therethrough and external annular flanges to selectively engage said seats, respectively; a pair of annular spring seats disposed normally in confronting engagement with the valve elements respectively, said seats each having an outturned annular flange engaging the inner face of the cooperating valve element, a cylindrical portion at right angles to the outturned flange, an inturned annular flange at right angles to the cylindrical portion, and a reduced diameter bearing opening disposed at right angles to the inturned flange; a normally preloaded helically formed centering spring disposed between said spring seats for biasing them apart and their associated valve elements to seat the latter elements on their respective valve seats in neutral positions; a central annular chamber between the spaced valve seats and associated valve elements; a port interconnecting the exterior of the body with the central chamber; a valve actuator coaxially disposed with respect to the valve seats and elements, and body and operably projecting through the coaxial openings in the valve and spring seats, and movable valve elements beyond the outer valve elements; a detachable collar mounted on the end of outer end of the actuator; an axial air passageway in the actuator terminating at the end thereof; an air vent through the adjacent end wall of the valve body with which the axial passageway is in continuous communication; an outer chamber between the collar and adjacent valve element; an annular flange formed integrally with the actuator adjacent the other valve element; another chamber between the last-mentioned flange and valve element; a radial air passageway interconnecting the first-mentioned chamber and axial passageway; another radial air passageway interconnecting the other chamber with the axial passageway; a port for selective communication from the exterior of the valve body with the first-mentioned chamber and central chamber aforesaid; a port for selective communication from the exterior of the valve body with the other chamber and central chamber aforesaid; a valve seat embedded in the inner face of the collar aforesaid adjacent the first-mentioned radial passageway for engagement by the outer end of the outer valve element to close said radial port and thus isolate the first-mentioned chamber from the axial passageway; another valve seat embedded in the inner face of the integral flange adjacent other radial passageway for engagement by the outer end of the other valve element to close said radial port and thus isolate the chamber adjacent the integral flange from the axial passageway; a reduced extension projecting from the integral flange; a stop element fixed to the valve body for engagement by the end of said reduced extension to limit relative displacement of the actuator in one direction with respect to the valve body; an annular internal groove disposed adjacent the outer end of the valve body hollow; a split retainer ring engaging said groove for limiting relative displacement of the actuator with respect to the valve body in the other direction; an annular counterbore in the confronting ends of the valve elements; an annular shoulder provided at the point of mergence of the normal diameter of the openings through the valve elements and the counterbore, said shoulders aligning in spaced relation with the face of the inturned flange of the spring seats aforesaid with the cylindrical portion thereof spaced from the actuator; a normally preloaded compression spring disposed in the annular space between the cylindrical portion and actuator in operative engagement with the shoulders and inturned flanges aforesaid tending to urge the valve element and associated spring seat apart thereby stabilizing the selected valve element seated when the force of the centering spring is removed temporarily during the unseating movement of the said valve element; a pair of longitudinally spaced annular shoulders on the actuator adapted to normally engage the inner marginal face of the inturned flange on the spring seat with the bearing opening thereof supported on the portion of the actuator between said shoulders, whereby the centering spring normally biases the spring seats into engaging contact with the valve elements and actuator shoulders to establish them and the valve body in neutral position wherein the outer chambers aforesaid are placed in communication with atmosphere via their respective open washer seats spaced from the opposed ends of the valve elements, radial passageways, respectively, axial passageway, and air vent, and the central chamber confined to the port communicating therewith; and a personally-operated member operably connected to the extension end of the actuator for selective actuation of the actuator relative to the valve body in opposition to the biasing force of the centering spring aforesaid.

2. A control valve for a double-acting pressure differential actuated motor, comprising: an axially bored double ended valve body; a pair of longitudinally spaced coaxial ring-like valve seats fixed in said axial bore; a pair of movable valve elements each carrying a face normally engaging with its complemental fixed seat; a vacuum chamber disposed between said movable elements; an air-vacuum chamber disposed on the opposite sides of each of said movable elements; a pair of centrally bored thrust members disposed in spaced coaxial relation between said movable elements normally in engagement therewith; an actuatable member reciprocably projecting through said fixed seats and the bores in said movable elements and thrust members to selectively act positively on said thrust members in opposite directions; a pair of longitudinally spaced air valve members carried by said actuatable member normally spaced from their respective cooperating movable elements; an air inlet to the bore in the valve body; passageway means in said actuatable member interconnecting each of the air-vacuum chambers with said air inlet when said air valve members are spaced from their cooperating movable elements; a valve seat carried on the opposite side of each of said movable elements; complemental seats on said air-valve members engageable with said valve seats on said movable elements; a normally preloaded spring operably disposed in said vacuum chambers to bias said thrust members into engagement with its cooperating movable element and the latter into seated engagement with said fixed seats; another normally preloaded spring operably disposed in encircling relation with respect to said actuatable member between each of said thrust members and their cooperating movable elements to continuously bias them apart with continuous reaction to maintain the selected movable element seated until positive actuation thereof is effected; a conduit leading from said vacuum chamber to a source of pressure different from atmosphere; a conduit leading from each of said air-vacuum chambers to the exterior of said valve body for connection to opposite ends of said motor; and means for actuating said actuatable member to impart limited relative movement thereof with respect to said thrust members and movable elements to selectively engage the valve seats on said actuatable member with their cooperating seats on said movable elements and to selectively disengage said valve seats on said movable elements from their cooperating fixed seats to selectively connect said vacuum chamber to said air-vacuum chambers to activate said motor in opposite directions.

3. A control valve according to claim 2 in which said fixed valve seats engage respectively internal annular shoulders in the axial bore of said body to establish their operative positions with respect thereto; and an internal annular groove in said axial bore spaced from one of said shoulders is engaged by a split retainer ring to prevent axial displacement of one of said fixed seats, thus enabling removal of both of said fixed seats.

4. A control valve according to claim 2 in which said movable valve elements each comprises: a tubular portion terminating at one end in a circular outstanding flange on which said complemental face is incorporated and the other end terminating in the seat on the opposite side thereof.

5. A control valve according to claim 2 in which said thrust members each is cup-shaped comprising: a cylindrical wall open at one end and closed at the other by an end wall in which is incorporated said central bore, and the open end terminates in an external outstanding flange normal to the axis of said member and normally receives reaction from said first-named spring to engage it with its cooperating movable element, said second-named spring encircling said actuatable member in circular alignment with said cylindrical wall to maintain said spring in its operating position with respect to said thrust member and movable element to bias them apart.

6. A control valve according to claim 5 in which said actuatable member is composed of two sections threadedly connected to form a unitary assembly, a medially reduced diameter portion defining a pair of external annular shoulders in spaced relation which selectively engage the marginal portion of said central openings in said thrust members to positively actuate the same against the bias of said first-mentioned spring thereby separating the flanged portion of said thrust members from their cooperating movable elements while the second-mentioned springs react on each of said movable elements to yieldably hold them seated until such positive actuation thereof is effected.

7. A control valve according to claim 2 in which said air valve members each comprises: a circular collar in one side of which is embedded a ring-like valve seat for selectively engaging the valve seats carried on opposite sides of said movable elements whereby actuation of said air valve member out of engagement with its cooperating movable element displaces the latter from its fixed seat against the bias of said first-named spring and in cooperation with said second-named spring to selectively connect said vacuum chamber to said pair of air-vacuum chambers.

8. A control valve according to claim 5 in which said passageway means comprise: an axial bore in said actuatable member in constant communication with said air inlet; and intersecting cross bores communicating with the spaces normally obtaining between said air valve members and movable elements when in normal relative spaced positions.

9. A control valve for a single-acting pressure differential actuated motor, comprising: an axially bored double ended valve body; a longitudinally spaced coaxial ring-like seat fixed in said bore; a movable valve element carrying a face normally engaging its complemental fixed seat; a vacuum chamber disposed between said movable element and one end of said valve body; an air-vacuum chamber disposed on the opposite side of said movable element; a centrally bored thrust member normally engaging said moveable element; an actuatable member reciprocably projecting through said fixed seat and the bores in said movable element and thrust member to act positively on said thrust member in one direction; an air valve member carried by said actuatable member normally spaced from said movable element; a valve seat on the opposite face of said movable element; a complemental face on said air valve member normally spaced from the valve seat on the opposite face of said movable element; an air inlet to the bore in said valve body; passageway means in said actuatable member interconnecting the space between said air valve member and movable element with said air inlet; a normally preloaded spring operably disposed in the bore of said valve body with one end bearing on the one end thereof and the other end reacting on said thrust member to bias it into engagement with said movable element and the latter into seated relation with its fixed seat; another normally preloaded spring operably disposed between said thrust member and movable element in encircling relation with respect to said actuatable member to bias them apart with continuous reaction to maintain said movable element seated until positive actuation thereof is effected; a conduit leading from said vacuum chamber to a source of pressure different from atmosphere; a conduit leading from said air-vacuum chamber to the exterior of said valve body for connection to one end of said motor; and means for actuating said actuatable member to impart limited relative movement thereof with respect to said thrust member and movable element to engage the valve seats on said actuatable member and movable element and disengage the valve seats on said movable element from its cooperating fixed seat to connect said vacuum chamber to the conduit leading from said air-vacuum chamber to activate said motor in one direction.

References Cited in the file of this patent

UNITED STATES PATENTS

| | | |
|---|---|---|
| 2,321,079 | Greenwald | June 8, 1943 |
| 2,503,827 | Langmore et al. | Apr. 11, 1950 |
| 2,637,303 | Cintron | May 5, 1953 |
| 2,735,268 | Stelzer | Feb. 21, 1956 |

FOREIGN PATENTS

| | | |
|---|---|---|
| 278,814 | Germany | Oct. 6, 1914 |